July 5, 1938. F. PAASCHE 2,123,061
SEALING MEANS FOR HIGH FREQUENCY CONCENTRIC CABLES
Filed Sept. 14, 1936

Inventor:
Fritz Paasche,
by Harry E. Dunbury
His Attorney.

Patented July 5, 1938

2,123,061

UNITED STATES PATENT OFFICE 2,123,061

SEALING MEANS FOR HIGH FREQUENCY CONCENTRIC CABLES

Fritz Paasche, Berlin-Charlottenburg, Germany, assignor to General Electric Company, a corporation of New York Application September 14, 1936, Serial No. 100,754
In Germany September 21, 1935

4 Claims. (Cl. 173—268)

The invention relates to a sealing means for high frequency concentric cable. Such a cable consists of a center conductor and an outer conductor or conductors. Distance pieces position the center conductor within the outer concentric conductor. A lead covering is provided over the outer conductor to weatherproof the cable. In practice difficulty is encountered due to the infiltration of water within the cable at its ends which reduces the dielectric strength of the cable and may result in a breakdown. Therefore it is necessary to provide a sealing means at the ends of the cables and where two cables are connected together.

An object of the invention is to provide a sealing means for high frequency cable which in addition tightens the individual lead sections against each other. The sealing means in accordance with my invention consists of a packing ring of material which produces small losses in a high frequency cable. The packing ring has a conical bore through which a connecting piece is passed. This connecting piece is soldered on both sides to the inside cable conductor. The sealing means includes a metallic cover on the outside of which a groove is rolled. A corresponding groove in the packing ring is lined with lead. The cover is connected with the cable conductor on the outside by means of two conical covers. These conical covers are slit along their length to make it possible to push them laterally over the cable. The longitudinal seam as well as the connecting points of the conical cover are soldered together with the metal cover and the outside cable leads respectively.

Figure 1:
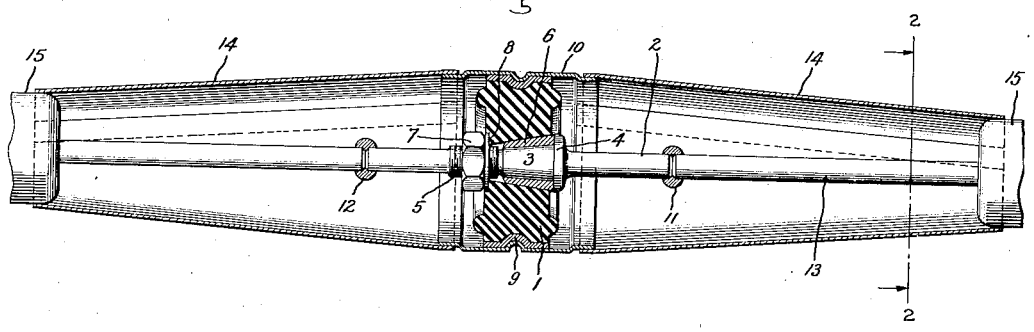
Figure 2:
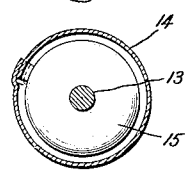

In the drawing an example of the sealing means is shown for a high frequency cable in which Fig. 1 shows a longitudinal section and Fig. 2 shows a cross section along the line 2—2 of Fig. 1. The packing ring 1 has an axial conical bore on the inside and a groove around the outside. Through the conical bore a metallic connecting piece 2 is led which is made cylindrical on both ends but has a cone 3 in the middle on which a collar 4 is provided on one side and a thread 5 on the other side. The cone 3 is surrounded by a lead sheath or cover 6. A nut 7 presses the packing ring 1 against the lead cover 6 of cone 3. A washer 8 is located between the nut 7 and the packing ring 1. On the packing ring 1 a lead sheath 9 is rolled. Over the whole a metallic cover 10 is pushed in which a groove is rolled corresponding to the groove of the packing ring 1. This cover is turned over on its edges. Connecting piece 2 is soldered at the points 11 and 12 to the cable conductor 13. Conical covers 14 which are slit lengthwise are pushed over the outside conductor 15 of the cable and the cover 10 on each side of the packing and are soldered to the cover 10 and to the outside conductor 15. The longitudinal seam of the conical cover 14 is overlapped as can be seen from Fig. 2.

What I claim as new and desire to secure by Letters Patent of the United States, is:

1. In combination with a high frequency concentric cable having inner and outer conductors, a packing ring of insulating material having a central conical bore through which the inner conductor extends and an outer peripheral groove, and means including portions of the inner and outer conductors respectively engaging said bore and said groove whereby the ring may be tightened between the inner conductor and the outer conductor.

2. In a coupling structure for high frequency concentric cables, a connector for connecting the ends of the inner conductors together, said connector having a conical surface in the center and a threaded end, a packing ring of insulating material fitting over the connector and having an axial conical bore to engage the cone on said connector, and clamping means threaded on said threaded end for forcing said conical surface against said conical bore.

3. In combination with a high frequency concentric cable having inner and outer conductors, a connector for the inner conductor, said connector having a conical part, a packing ring provided with a conical bore adapted to fit the conical part of the connector, said packing ring being provided with an external peripheral groove, an outer cover for said ring, said cover having a groove nesting with said peripheral groove, lead sheaths located between the packing ring and the connector and between the packing ring and said outer cover, and a second covering extending between said outer cover and the outer conductor of said cable whereby a water-tight seal is produced.

4. In combination with a high frequency concentric cable having inner and outer conductors, a connector adapted to be connected to the inner conductor, said connector having a conical surface at its center and a threaded portion adjacent the conical surface, a ring of insulating material having a conical bore adapted to fit the conical portion of said connector, a lead sheath interposed between said connector and said ring, a nut forcing said conical surface against said conical bore and securing the ring on said connector, a lead sheath located around the outside of the ring, an outer cover secured to said outside lead sheath and a second cover connected to the outer conductor of the cable and to said outer cover whereby a weather-proof sealing means is provided for the cable.

FRITZ PAASCHE.